US009355007B1

(12) United States Patent  
Eicher

(10) Patent No.: US 9,355,007 B1  
(45) Date of Patent: May 31, 2016

(54) IDENTIFYING ABNORMAL HOSTS USING CLUSTER PROCESSING

(71) Applicant: Amazon Technologies, Inc., Reno, NV (US)

(72) Inventor: Anton André Eicher, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 13/942,499

(22) Filed: Jul. 15, 2013

(51) Int. Cl.  
 *G06F 11/00* (2006.01)  
 *G06F 11/34* (2006.01)

(52) U.S. Cl.  
 CPC ........ *G06F 11/3428* (2013.01); *G06F 11/3447* (2013.01); *G06F 11/3452* (2013.01)

(58) Field of Classification Search  
 CPC ............ G06F 11/0703; G06F 11/0751; G06F 11/0754; G06F 11/34; G06F 11/3428; G06F 11/3447; G06F 11/3452  
 See application file for complete search history.

(56) References Cited

U.S. PATENT DOCUMENTS

| 7,395,187 | B2 * | 7/2008 | Duyanovich et al. | ......... 702/183 |
| 7,484,132 | B2 * | 1/2009 | Garbow | ....................... 714/47.2 |
| 7,930,593 | B2 * | 4/2011 | Ozonat | .......................... 714/33 |
| 8,862,727 | B2 * | 10/2014 | Jayachandran et al. | ...... 709/224 |
| 8,943,205 | B2 * | 1/2015 | Dutta et al. | ................... 709/226 |
| 2002/0188618 | A1 * | 12/2002 | Ma | ........................ G06T 11/206 |
| 2014/0258791 | A1 * | 9/2014 | Kew | ................................ 714/49 |

OTHER PUBLICATIONS

Ian Gregorio-de Souza, Vincent Berk, and Alex Barsamian; "Using principal component analysis for selecting network behavioral anomaly metrics;" Proc. SPIE 7666; May 3, 2010; <<http://dx.doi.org/10.1117/12.852399>>; retrieved from the Internet on May 8, 2015.*

* cited by examiner

*Primary Examiner* — Joseph Kudirka  
(74) *Attorney, Agent, or Firm* — Davis Wright Tremaine LLP

(57) ABSTRACT

A method and apparatus for identifying abnormal clusters are disclosed. In the method and apparatus, host activity data is received and cluster processing is performed on the host activity data of the plurality of hosts to determine the presence of any abnormal clusters of abnormal host activity data. The cluster processing results in a yielded clusters that are then compared with baseline clusters to identify the abnormal clusters.

24 Claims, 8 Drawing Sheets

IDENTIFYING ABNORMAL HOSTS USING CLUSTER PROCESSING

BACKGROUND

The use of remote program execution, such as running virtual computer systems (virtual machines) on behalf of customers, and storage services has proliferated in recent years. The resources for remote program execution and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turn to using the resources of the computing resource providers. Remote program execution and storage services allows content providers and online merchants, among others, to efficiently and adaptively satisfy their computing needs, whereby the computing and storage resources used by the content providers and online merchants are added or removed from a large pool provided by a computing resource provider as need and depending on their needs.

It is often important for the computing resource provider to be able to identify abnormalities and failures that occur at a large scale in their fleet of servers, storage devices and equipment. For example, a computing resource provider may seek to identify hosts, whether virtual or physical, that perform abnormally or fail due to a hardware or software deployment.

BRIEF DESCRIPTION OF THE DRAWINGS

Various embodiments in accordance with the present disclosure will be described with reference to the drawings, in which.

DETAILED DESCRIPTION

Figure 1:
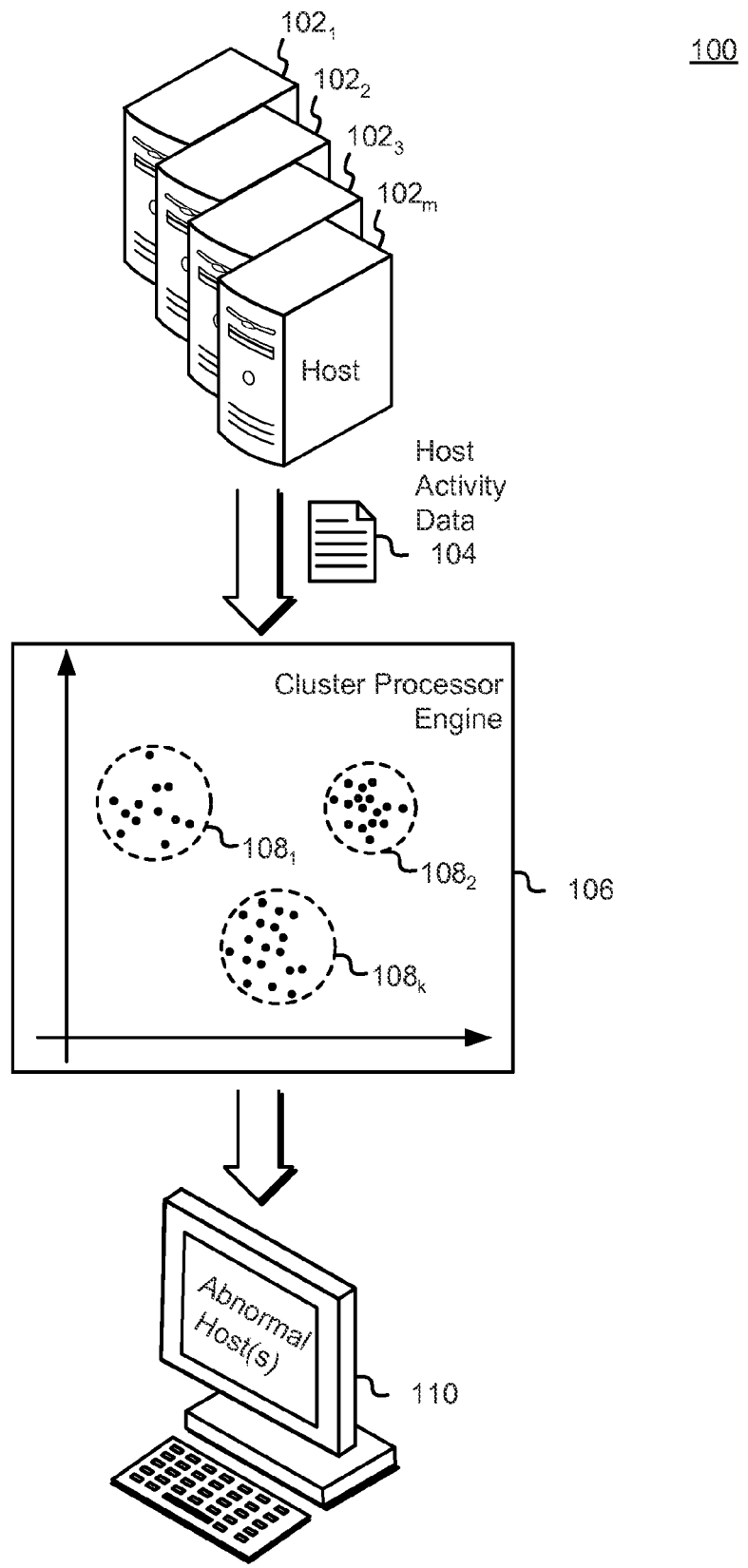
FIG. 1 shows an example of cluster processing for a plurality of hosts using host activity metrics.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include identifying physical or virtual hosts in a remote program execution service that are malfunctioning or otherwise performing abnormally. Remote program execution and storage services may be provided by a computing resource service provider that employs a plurality of hosts, storage volumes or other devices to provision computing resources to customers. A host activity report including host activity data for the plurality of volumes may be sent to an on-demand storage service. The host activity report may include utilization data or statistics for the plurality of hosts. The utilization data or statistics may be captured over an interval of time or at a snapshot in time. The host activity data may indexed by time of data capture or by the host to which the activity data pertains and a mapping between host activity data and time of data capture or host may be maintained.

The host activity data included in the host activity report may be CPU utilization, network bandwidth utilization, disk latency, disk utilization or average load of the hosts. The host activity data may also be system activity report (SAR) data of physical hosts, such as Linux system activity report data, including the number of read or write requests per second issued to the physical hosts, the number of major memory page faults the physical hosts made per second, or the number of packets received or transmitted from the physical hosts per second, among others.

The host activity data may originate from a virtualization layer and may be reported by application programs equipped with operational or executable instructions that cause virtualization to be performed and that cause a physicals host or server to be decoupled from virtual hosts on which customer or guest operating systems and application may run. In addition, host activity data may be reported by application programs equipped with operational or executable instructions for performing billing or networking tasks.

Following sorting and indexing host activity, data may be represented as an n-dimensional vector of measured or reported statistics or metrics, whereby each vector may be associated with a host and time of data capture. Each entry or dimension in the n-dimensional vector may be dedicated for one category of host activity metrics. By way of example, a first entry may be dedicated to CPU utilization, a second entry may be dedicated to the total number of read requests per second issued to a host as gleaned from a system activity report, a third entry may be a percentage of used memory as gleaned from the system activity report and the like. The n-dimensional vector of host activity data may be represented by a point in n-dimensional space, whereby two or more hosts who experience similar activity and are under similar conditions are expected to be have corresponding points in n-dimensional space that are close to each other as measured by a distance metric, such as the Euclidean distance metric. Conversely, when two or more points in n-dimensional space are distant, as measured by a Euclidean distance, for example, the two or more points are said to represent associated hosts that are experiencing varying activity or conditions. Cluster processing may be performed on a plurality or points in n-dimensional space representing activity data of a plurality of hosts to yield one or more clusters, where each cluster yielded by cluster processing represents a group of hosts having or experiencing similar activity. It should be noted, however, that while Euclidean spaces utilizing Euclidean metrics are provided for the purpose of illustration, non-Euclidean spaces and metrics may be utilized. For example, data may be represented using n-dimensional vectors where the distance between vectors is measured using a non-Euclidean metric. Further, the distance between vectors may be measured using a weighted metric, such as the weighted Euclidean distance.

To identify abnormalities in a fleet of host as observed on a large scale, host activity data may be reported and cluster processing may be applied to the host activity data to produce a plurality of clusters of detected host activity data. Then, the cluster-processed data may be compared with baseline host activity data that represents the state of the hosts during normal operations. Deviations from baseline clusters are said to represent abnormal hosts.

With remote program execution service, which may be implemented as a virtual computer system service, discussed below in connection with FIG. 2, in various embodiments, computational resources are made available to users and subscribers on an on-demand basis. The computational resources may be provided by a computing resource service provider that has a large array of processing and storage equipment that may include many servers, storage disks, networking equipment, server racks and the like. A remote program execution service allows subscribers to forgo investing in computers and others storage equipment and instead the subscribers may rent resources as needed from the computational resource service provider. Further, the need for subscribers to retain dormant equipment for use when demand for computing resources increases is alleviated. Instead, the subscribers may add or remove resources from those made available by the computing resource service provider as the subscribers' demand for the resources changes. Furthermore, remote program execution alleviates the need for subscribers to retain additional equipment for redundancy or to back-up their data as the subscribers may also use for redundancy the pool of available resources provided by the computing resource provider.

The subscribers may add or remove resources as the needs of the subscribers change and the portion of the computational resources utilized by the subscribers to those of the pool of computational resources may be scaled accordingly.

Computing resource service providers may provision computational resources (including processing resources, storage resource and the like) to subscribers. The provisioned computational resources may be derived from a network of servers and storage equipment that may in some cases account for many thousands or even millions of devices. In addition, computing resource providers may employ virtualization to decouple the underlying hardware of the network of servers and storage equipment from the virtual processors and the virtual storage perceived by the subscriber, thereby enabling the implementation of multiple virtual devices on a single physical device, allowing for more efficient utilization of computing resources.

It is recognized that the devices used in remote program execution sometimes experience hardware and/or software malfunctions. In some cases, a device in the network may malfunction independently of another device in the network. However, in other cases malfunctions in a fleet of devices may occur at a scale and become network-wide events. Further, in some cases the malfunctions may be interrelated and may have common causes or may be due to the conditions of the devices or interactions between the devices. It is of importance for the computing resource service provider to identify malfunctions at scale and abnormalities in a fleet of devices. Such identification can be difficult given the numbers of computing devices often managed by organizations such as computing resource service providers. It is also important to analyze the malfunctions to identify the root causes of malfunctions at scale and abnormalities in a fleet of devices and to adaptively learn about the malfunctions and target them if they reoccur. Cluster processing may be used to identify abnormal or malfunctioning devices or hosts. Cluster processing uses metrics reported by the devices or hosts to identify devices or hosts that are malfunctioning or abnormal. Abnormal devices or host are identifiable when cluster processing is performed as compared to a baseline cluster model, where little or no malfunctioning is experienced by the devices. After the devices or hosts that are abnormal or that experience malfunctions are identified, the devices or hosts may be corrected and the computational resource provider may ensure that the computational resources provided to the subscribers may continue uninterrupted.

FIG. 1 shows an example of cluster processing for a plurality of hosts using host activity metrics. A plurality of hosts $102_1, 102_2, \ldots, 102_m$ (collectively referred to hereinafter as hosts $102_{1-m}$ and singularly referred to hereinafter as host 102) report host activity metrics 104 to a cluster processor engine 106. The host 102 may be a physical host, such as a computer, a server, a host machine or a sensor. The host 102 may also be a virtual host that runs using a virtualization layer on one or more underlying physical hosts. The host activity metrics 104 may be related to hardware or software resource utilization, diagnostic information, activity information and the like. The host activity metrics 106 may include processing power utilization, such as central processing unit (CPU) utilization, processing loads, network utilization and diagnostic information associated with the host 102.

The host activity metrics 104 may be an n-dimensional vector for each host 102, whereby each dimension of the n-dimensional vector may represent an activity category, for example, a predefined activity category. Further, the host activity metrics 104 may require pre-processing to render an n-dimensional vector.

The host activity metrics 104 of each of the hosts $102_{1-m}$ are provided to a cluster processing engine 106. The cluster processing engine 106 may use a clustering algorithm, such as a K-means clustering algorithm, to group the hosts $102_{1-m}$ into K clusters $108_{1-k}$ based at least in part on the received n-dimensional activity data vectors. In FIG. 1, 2-dimensional clustering is shown for illustration and for ease of description but it is recognized that the number of dimensions used by a clustering algorithm may be any integer. Each cluster 108 generated by the cluster processing algorithm has an associated centroid and a frequency, whereby the centroid represents the center of the cluster in space, for example, n-dimensional space, and the frequency represents the number of n-dimensional activity data vectors in the cluster 108. A cluster 108 may be interpreted as a group of hosts $102_{1-m}$ having similar host activity reports or activity reports that are within a margin of one another. Accordingly, a cluster 108 may be a group of hosts $102_{1-m}$ that are operating at normal or baseline conditions or the cluster 108 may indicate hosts $102_{1-m}$ that are experiencing certain abnormalities. The hosts grouped in a cluster 108 may also be experiencing abnormalities that have a root cause in common. The location of a cluster 108 in Euclidean space, for example, may also serve as an indicator of the type of abnormality experienced by the hosts of the cluster 108 or the cause of the abnormality experienced by the hosts of the cluster 108.

After performing cluster processing or K-means processing on the host activity data, the generated clusters may be compared with or subtracted from baseline clusters that are generated based at least in part on activity data collected for hosts $102_{1-m}$ that are under normal operating conditions. The difference between the results indicates abnormalities in host 102 conditions that have risen.

After the clusters $108_{1-k}$ that represent abnormal hosts are identified, the clusters are provided to a service terminal 110 of the computing resource provider. The computing resource provider may then identify abnormal and malfunctioning hosts using the clusters. The computing resource provider may analyze the results to identify the causes of host abnormal behavior, malfunctioning or failure.

Figure 2:
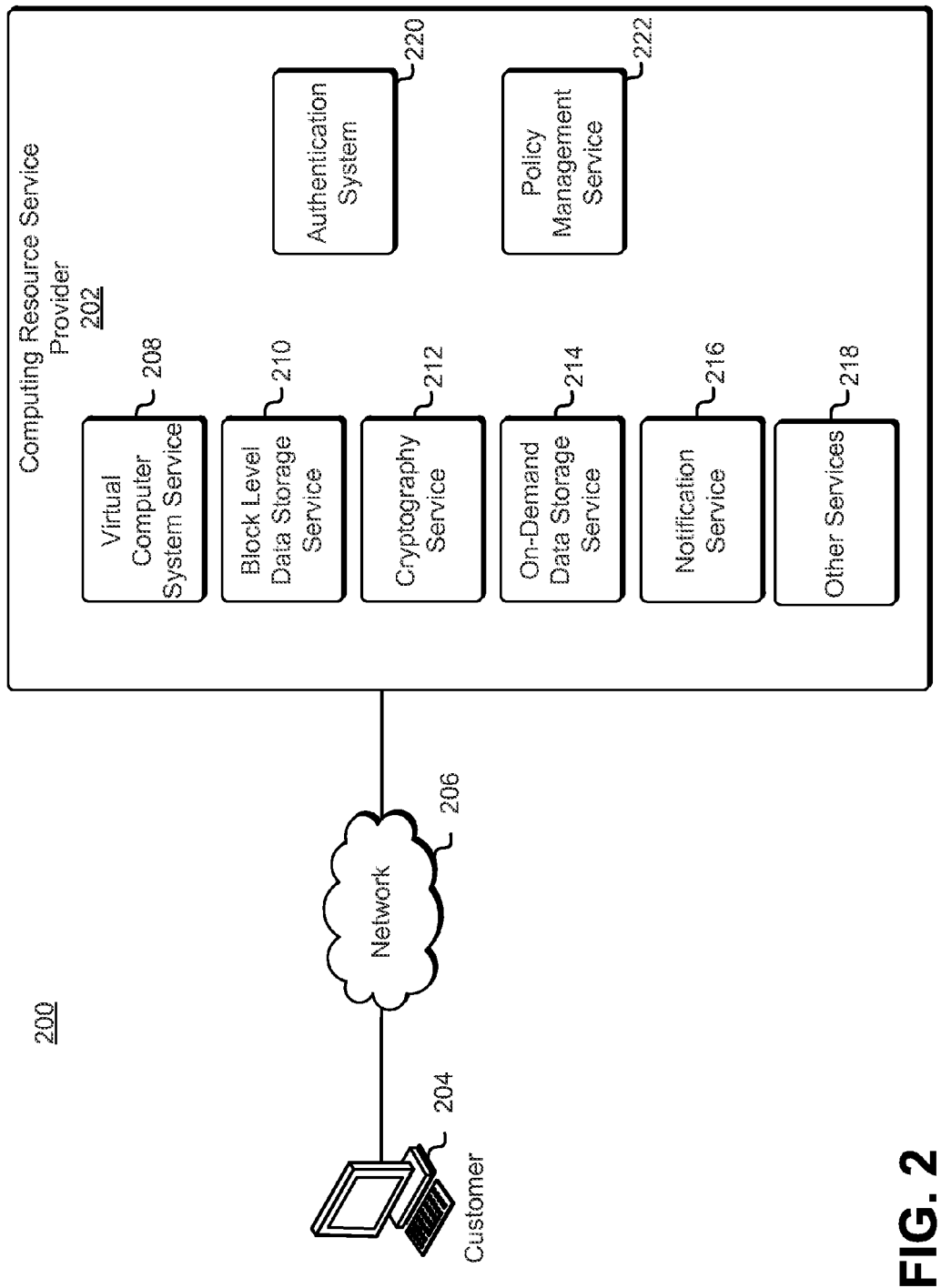
FIG. 2 shows an example of a customer connected to a computing resource service provider.

FIG. 2 shows an example of a customer connected to a computing resource service provider. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214 and one or more other services 218. It is noted that not all embodiments described herein include the services 208-218 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. Other services and/or components may also be included in the environment 200. Similarly, techniques of the present disclosure apply to other environments.

Figure 3:
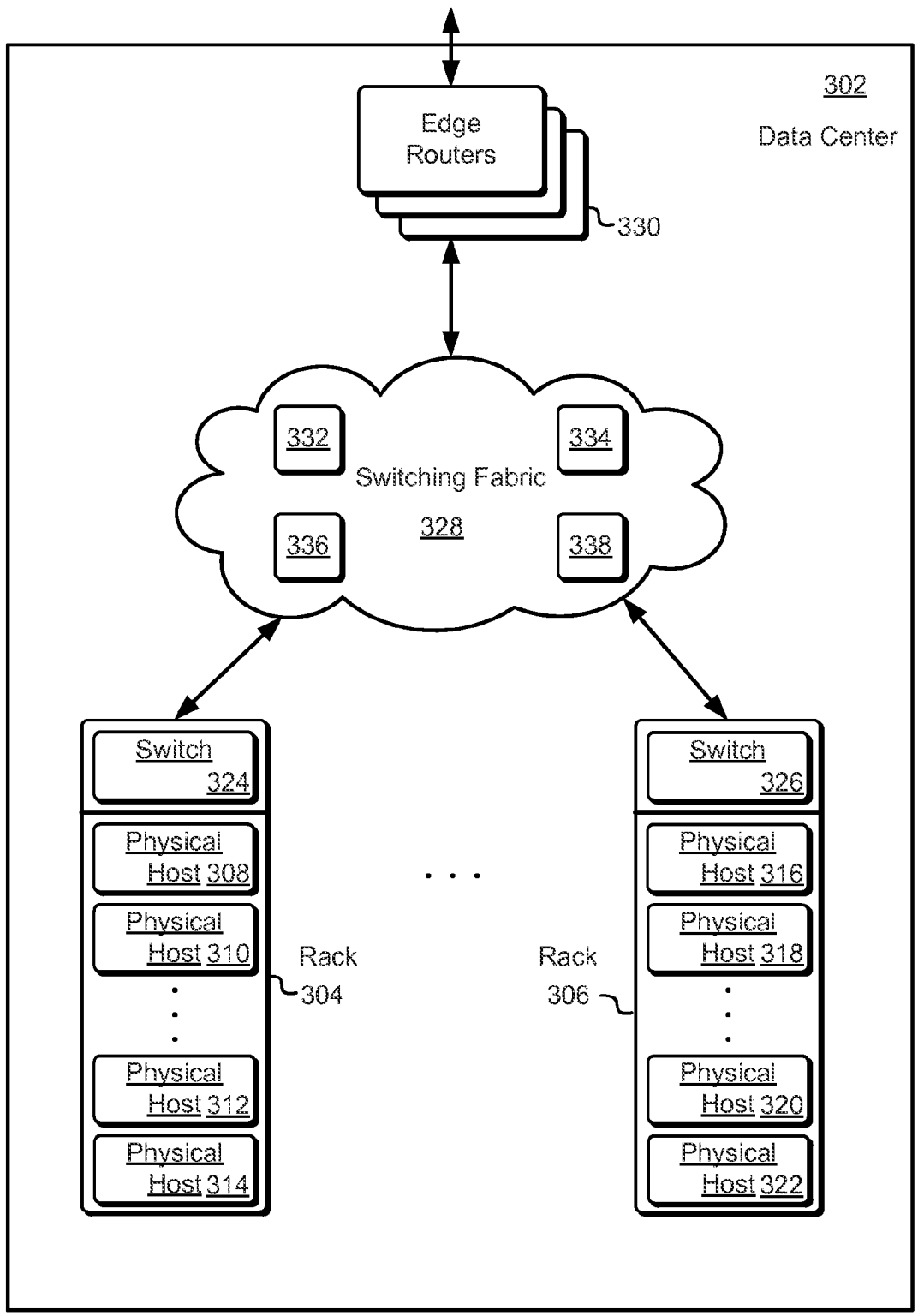
FIG. 3 depicts aspects of data centers in accordance with at least one embodiment.

FIG. 3 depicts aspects of data centers in accordance with at least one embodiment. A data center 302 may include multiple server racks 304-306. The data center 302 is an example of one or more data centers that may be used to implement a computing resource service provider, such as the computing resource service provider described with reference to numeral 202 in FIG. 2. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple physical hosts 308-314 and 316-322. Again, the ellipses indicate that the server racks 304-306 may include any suitable number of physical hosts. For example, the physical hosts 308-322 may include one or more virtual computing system service servers, and/or one or more data store servers.

In FIG. 3, each server rack 304-306 is depicted as including a rack switch 324-326. The rack switches 324 and 326 may be responsible for switching packets of digital data to and from their respective sets of physical hosts 308-314 and 316-322. The rack switches 324-326 may be communicatively linked to a data center switching fabric 328 and then to a set of edge routers 330 that connects the data center 302 to one or more other computer networks including the Internet. The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328.

Figure 4:
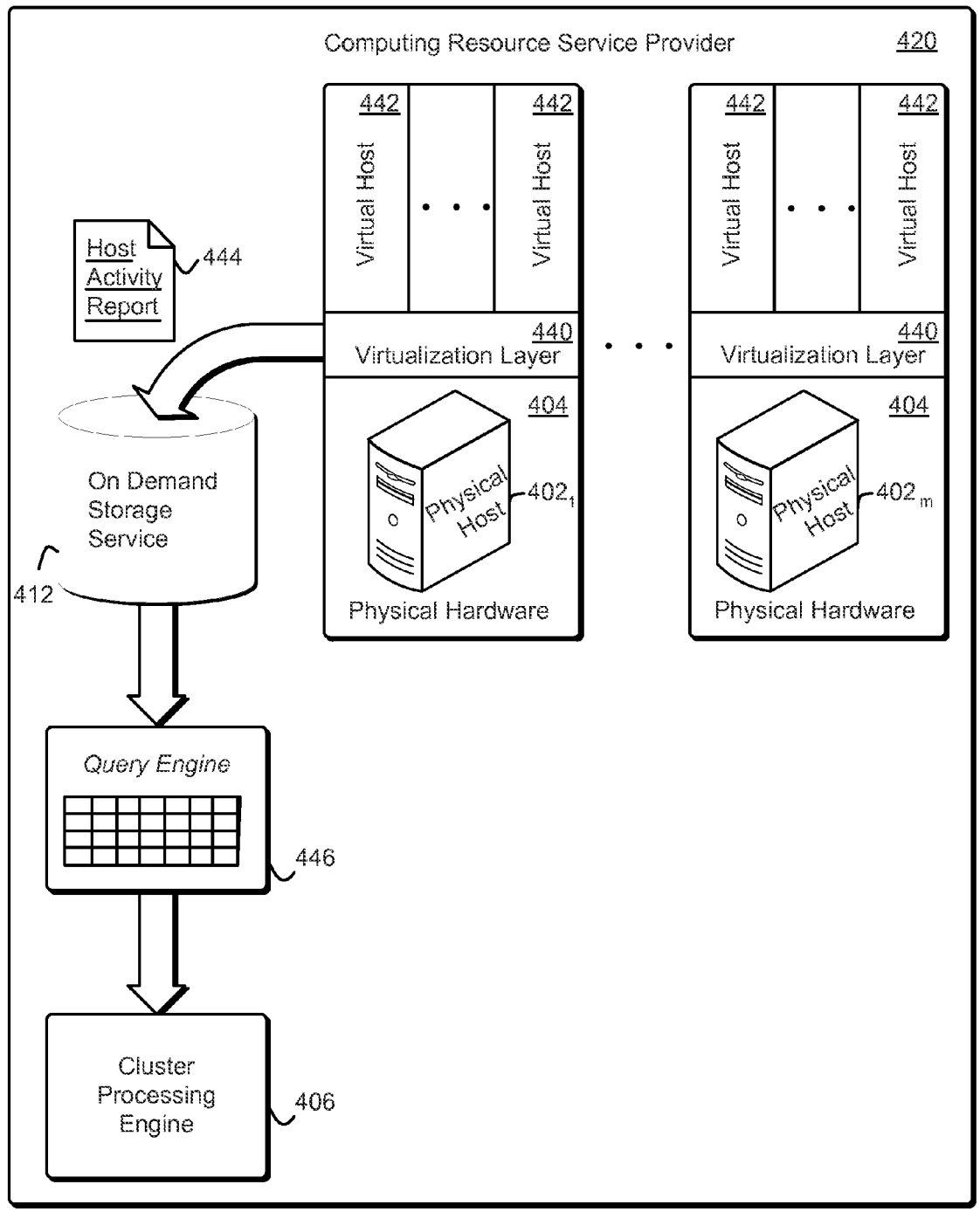
FIG. 4 shows a block diagram for cluster processing of host activity data.

As described herein, an activity report for a physical host or a virtual host may be sent for cluster processing to be used for identifying abnormal hosts. FIG. 4 shows a block diagram for cluster processing of host activity data. Physical hardware 404 is used by a computing resource service provider 420 for providing computation resources for customers. The physical hardware 404 may include physical hosts $402_{1-m}$. The physical hosts $402_{1-m}$ may be any device or equipment configured to execute instructions for performing data computation, manipulation or storage tasks, such as a computer or a server. A physical host 402 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The physical hardware 404 may also include storage devices, such as storage disks and tapes, networking equipment and the like.

A virtualization layer 440 in the computing resources service provider 420 enables the physical hardware 404 to be used to provide computational resources upon which one or more virtual hosts 442 may operate. The virtualization layer 440 may be any device, software or firmware used for providing a virtual computing platform for the virtual hosts 442. The virtual computing platform may include various virtual computer components, such as one or more virtual CPUs, virtual memory and the like. The virtual hosts 442 may be provided to the customers of the computing service resource provider 420 and the customers may run an operating system or an application on the virtual host 442. Further, the computing service resource provider 420 may use one or more of its own virtual hosts 442 for executing its applications. Examples of the virtualization layer 442 include a hypervisor.

The virtualization layers 440 provide a host activity report 444 associated with the physical hardware 404, one or more physical hosts $402_{1-m}$ or the one or more virtual hosts 442. The host activity report 444 may include utilization, activity or operational information or statistics for the physical hardware 404, physical hosts $402_{1-m}$, virtual hosts 442 or applications that are executed on the physical hosts $402_{1-m}$ or the virtual hosts 442. The information included in the host activity report 444 may be gathered or compiled over an interval of time or taken at one or more snapshots in time.

It is noted that although the embodiments described herein are described with reference to the physical hosts $402_{1-m}$ of the physical hardware 404 or the virtual hosts 442, the embodiments may be utilized for performing cluster processing and identifying malfunction and abnormalities in any element, device or component of the physical hardware 404, such as storage devices and networking equipment, and any application or program having operational or executable instructions that are configured to be executed using the physical hardware 404 or a virtualized platform based upon the physical hardware 404.

A host activity report 444 may include CPU utilization, network utilization, disk latency or average load of the virtual hosts 442. The host activity report 444 may further include system activity report (SAR) data of the physical hosts $402_{1-m}$, such as Linux system activity report data, including the number of read or write requests per second issued to the physical hosts $402_{1-m}$, the number of major memory page faults the physical hosts $402_{1-m}$ made per second, or the number of packets received or transmitted from the physical hosts $402_{1-m}$ per second, among others.

The host activity report 444 may include information indicating the host or hosts to which the report pertains. Further, the host activity report 444 may include an indication of the time when the report was generated or the time or an interval of time when the data of the report was captured, reported or measured. The host activity report 444 may include, for each physical host 402, a multi-dimensional vector comprising numeric of alphanumeric activity data. Each entry in the vector may be assigned to represent an activity data or associated information. For example, the multi-dimensional vector for each host may be:

Host multi-dimensional vector=[Physical host identity, timestamp or time duration of data capture, activity data {CPU utilization, network utilization, disk latency, average load, SAR data, . . . }]

In this example, the first entry of the multi-dimensional vector of every host represents the host identity, the second entry is reserved for the timestamp or time duration of data capture or data sampling, the third entry is the CPU utilization, the fourth entry is network utilization, etc. The host activity report 444 is collected by the computing resource service provider 420 or an entity within the computing resource service provider 420, such as the virtualization layer 440 or a virtual host 442, and stored to a storage location in the on-demand storage service 412.

When stored in the on-demand storage service 412 the host activity report 444 may also be indexed with respect to time, activity type and host. For example, when the host activity report 444 is stored as a file in the on-demand storage service 412, a virtualization layer 440 or another entity within the computing resource service provider 420 may record in another file (for example, serving as an index file) the name of the file containing the host activity report 444 and an identity of the host or hosts to which the host activity report 444 pertains. The virtualization layer 440 or another entity within the computing resource service provider 420 may also record in the index file or a further file, the name of the file containing the host activity report 444 and the time at which the host activity was captured or reported. Accordingly, a mapping between a host activity report and time of data capture or host may be maintained.

A plurality of host data that is collected over time may be combined into one host activity report 444 and sent to the on-demand storage service 414 at a predetermined time or at a specified rate. For example, four host activity reports may include data collected over one day and the four host activity reports may be sent at four different times in the day.

A query engine 446 retrieves the data of one or more host activity reports 444 from the on-demand storage service 412. The query engine 446 may retrieve activity data of the one or more host activity reports 444 based at least in part on the data capture or data reporting time stored in the index file or the identity of the host to which the activity data of the one or more host activity reports 444 pertains. The query engine 446 organizes the retrieved data into searchable and filterable host activity data. The query engine may also perform feature extraction and translate or transform non-numeric data into a numeric counterpart. To organize the data, the query engine 446, for example, may create a matrix of host activity data, whereby each row of the matrix pertains to a host and whereby each column includes data pertaining to an activity metric of the host. In some instances, the activity data reported by in a host activity report 444 may not be numeric and the query engine 446 may create a numerical equivalent for the non-numeric data and may use the numeric equivalent when constructing the sorted data. For example, if the host activity data includes log messages associated with the host and if each of the log messages had an associated log message type, such as debug, information, warning, error and fatal, the query engine 446 may assign a numeral to each log message type, such as 0 for debug, 1 for information and the like. Further the query engine 446 may count the number of occurrences of log messages of each type and create column entries in the matrix or searchable data structure for each of the numerical equivalent of the log message types and the associated number of occurrences of log messages of each type.

Other non-numeric-to-numeric data transformations include log message to the word count of the log message or character length of the log message.

A data structure for host activity may include hundreds or thousands of activity categories that are measured for each host. When each activity category is represented by a dimension in Euclidean space, a host having metrics that are collected for each activity category may be represented as a point in the Euclidean space. Two hosts having similar activity measurements are expected to be close each other in the Euclidean space, whereas two hosts with somewhat varying activity measurements are expected to lie far apart in the space.

The host activity data structure is provided to a cluster processing engine 448. The host activity data may be provided as an n-dimensional vector and the n-dimensional vector may be a data point in n-dimensional space. Further, the host activity data may be plotted in an n-dimensional Euclidean space, whereby n represents the number of host activity categories. The cluster processing engine 448 operates to apply a cluster processing algorithm, such as K-means clustering, to the data structure to yield a plurality of clusters (numbered as K). Each cluster includes points in the Euclidean space pertaining to similarly disposed or like hosts, whereby two hosts pertaining to the same cluster are expected to be experiencing activity conditions having greater similarity than two hosts that pertain to different clusters.

Cluster processing may be facilitated by using a parallel or distributed processing algorithm, such as Hive being executed on Hadoop or MapReduce. Mapreduce facilitates distributed processing by dividing a task among a plurality of parallel processing engines that are referred to as nodes. Host activity reports may be read from the on demand storage service 412 and a 2-D table of host activity vectors may be constructed. To construct the table, a plurality of Mapreduce nodes may be used, whereby each node preprocesses a host activity report to generate a host activity vector. When the host activity vectors are generated, the host activity vectors are placed in the 2-D table for cluster processing.

Abnormalities or impairments in hosts and the presence of abnormal hosts may be detected on a scale by comparing the cluster-processed host activity data captured at a pertinent time to the cluster-processed host activity data captured under normal operating conditions or baseline conditions. The differences between the results of the cluster processing of host activity data captured at a time and the results of the cluster processing of host activity data captured under normal operating conditions or baseline conditions serve to indication abnormalities or malfunctioning in hosts that occur at a scale.

Figure 5:
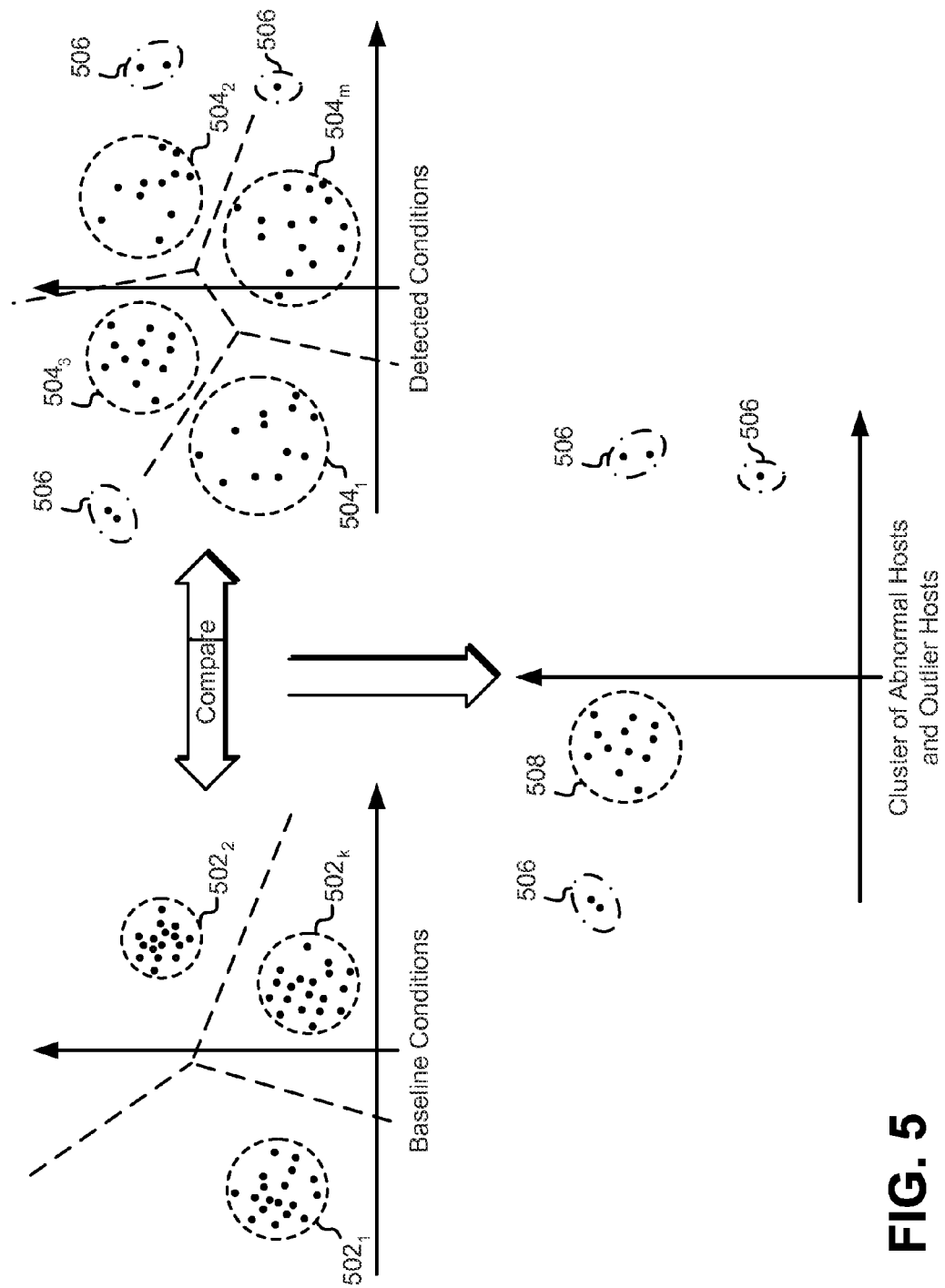
FIG. 5 shows an example of comparing the results of cluster processing at the detected conditions to the results of cluster processing at baseline conditions in a Euclidean plane.

FIG. 5 shows an example of comparing the results of cluster processing at the detected conditions to the results of cluster processing at baseline conditions in a Euclidean plane. A plane is used for ease of illustration but any number of dimensions for the Euclidean space may be contemplated. The cluster processing of host activity data when the hosts are experiencing baseline conditions or when the hosts are operating normally resulted in a plurality of baseline conditions clusters $502_{1-k}$. However, due to the changes in the operating condition of the hosts from baseline conditions to the detected conditions, the cluster processing of host activity data when the activity data were detected resulted in a plurality of detected conditions clusters $504_{1-m}$ having characteristics that are different those of the baseline conditions clusters $502_{1-k}$. Clusters may be characterized by their boundaries in an n-dimensional space or their associated centroid or frequency.

Some of the detected conditions clusters $504_{1-m}$ have similar characteristics as the baseline conditions clusters $502_{1-k}$. For example, baseline condition clusters $502_1$, $502_2$, $502_k$ are similar to detected conditions clusters $504_1$, $504_2$, $504_m$, respectively, as each pair have centroids that are close to each other in the Euclidean space and are bounded by similar boundaries in the Euclidean space. A centroid of a cluster is the geometric center of the vectors of a cluster or the arithmetic mean of the vectors of the cluster and the frequency is the number of vectors or data points of the cluster.

In addition, the pairs of cluster have similar frequency counts. It is noted that rules may be set that define the manner in which similar clusters are determined. A maximum distance may be set for determining whether centroids are similar. Clusters may be deemed similar if their centroids are close to each other in distance (for example, based at least in part on a Euclidean, Chebychev or other metric). The clusters may also be deemed similar if the boundaries of the clusters are within a margin of one another or if the frequencies of the clusters are within an integer of one another. Further, clusters may also be deemed similar if the clusters overlap by a portion or a percentage or according to another criteria. A similarity measure between two clusters may be the mean distance between cluster means or cluster centroids or the equivalency of the frequency or size of a cluster. In one embodiment, a cluster may have a mean and a radius, whereby the mean is the geographic center of the cluster in n-dimensional space and the radius is distance between the mean and a boundary of the cluster. The mean and radius may be used to determine whether two clusters are similar or equivalent. In addition, a statistical measure, such as the Mahalanobis distance, may determine the similarity or the affinity between two clusters.

Because clusters $502_1$, $502_2$, $502_k$ are determined to be similar to clusters $504_1$, $504_2$, $504_m$, it may be deemed that hosts defined by clusters $504_1$, $504_2$, $504_m$ under the detected conditions did not experience an abnormality as a result of the change in conditions from the baseline conditions to the detected conditions. Based at least in part on the comparison of the baseline conditions clusters $502_{1-k}$ to the detected conditions clusters $504_{1-m}$ a cluster of abnormal hosts 508 is detected. In addition, five points 506 representing other hosts are detected. Although identified separately than the clusters $504_{1-m}$, the five points 508 may lie within the boundaries characterizing either one of the detected conditions clusters $504_1$, $504_2$, $504_m$. Further, the five points 506 may be clustered separately than any of the other detected conditions clusters $504_1$, $504_2$, $504_m$. However, because cluster processing is sometimes intended to identify features that are observed at a scale, the five points 506 may be deemed as outliers due to their small frequency and their distance (for example, Euclidean) from the centroids of the clusters $504_{1-m}$.

Figure 6:
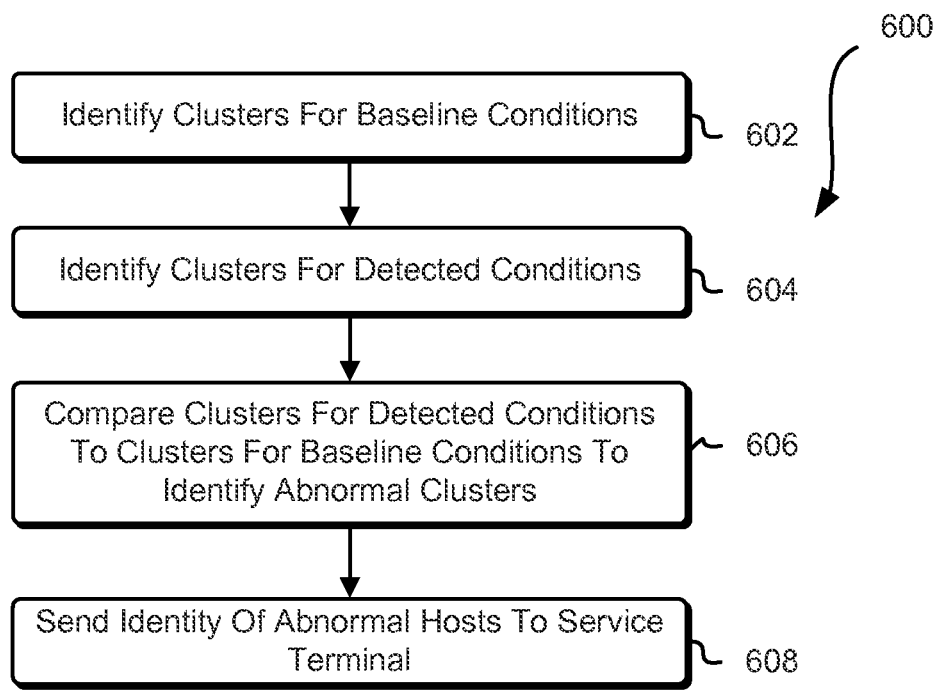
FIG. 6 shows an example of a method for identifying abnormal hosts using cluster processing.

FIG. 6 shows an example of a method for identifying abnormal hosts using cluster processing. In the process 600, a cluster processing engine, such as the cluster processing engine described with reference to numeral 406 in FIG. 4, identifies 602 clusters for baseline conditions. The baseline conditions clusters may be identified by applying a K-means processing algorithm on host data that represents the conditions of hosts, for example, physical hosts, in baseline or normal conditions. Hosts that are in normal or baseline conditions may be hosts that free of hardware or software failure and are operating with measured activity over a period of time within an acceptable range for at least a subset of the measurements that are taken. Baseline or normal conditions may be determined empirically, such as by measuring the activity of various hosts identified as operating normally over a time period. Further, cluster size may be used to determine normal or baseline conditions. For instance, in a large fleet of hosts, with a relatively small number or reported problems, it can be assumed that large clusters correspond to hosts operating normally. Baseline conditions may be operational conditions that do not strain the resource of a host.

The cluster processing engine also identifies 604 clusters for the detected conditions. Similar to the baseline conditions clusters, the clusters for baseline conditions may be identified by applying a K-means processing algorithm on host data. The K-means processing algorithm for the clusters of the detected conditions may be configured to yield no less than the number of clusters for the baseline conditions. The clusters for the detected conditions may be identified using a centroid and a frequency of the clusters or the boundaries in n-dimensional space of the clusters, whereby hosts whose n-dimensional vector of activity data is positioned within the boundary of a cluster is deemed to be part of the cluster.

The cluster processing engine then compares 606 the clusters for the detected conditions with the clusters for the baseline conditions to identify abnormal clusters. The comparison may be based at least in part on the centroids of the clusters, the frequency of the clusters or the boundaries of the clusters. A margin may be defined whereby clusters whose boundaries are within the margin of one another may be deemed to be equivalent or similar. Similarly, clusters whose centroids or frequencies are within a margin of one another may also be deemed similar. Similar clusters may be paired or may "canceled out" one another and remaining clusters may be deemed to be clusters identifying abnormal hosts.

The cluster processing engine then sends 608 an identity associated with the abnormal hosts to a service terminal. The service terminal may cause the identity associated with the abnormal hosts to be provided to an operator, for example, a human operator. The identity associated with the abnormal hosts may be accompanied with activity data associated with the abnormal hosts. The service may determine the cause of the abnormality based at least in part on the identity of the abnormal hosts. For example, a software or hardware update may be determined to be the cause of the abnormality.

It is noted that when identifying 602 clusters for baseline condition in the process 600, the cluster processing engine may read the information associated with the clusters from memory instead of running a cluster processing algorithm on the baseline host activity data. As may be recognized, baseline host activity data may only need to be collected once and its clusters may only need to be identified once. Once identified, the clusters for baseline conditions may be used repeatedly for identifying abnormal hosts, for example, at different points in time. However, if the definition of what is deemed to be baseline conditions changes, the service may place hosts in baseline conditions and recapture the activity data of the baseline conditions hosts. Further, follow capturing the activity data of the baseline conditions hosts, cluster processing is performed for usage in identifying abnormal hosts.

The hosts that form a cluster of abnormal hosts may experience similar activity and operating conditions. The hosts may be determined to be malfunctioning and may require repair. Further, due to the premise that a particular malfunctioning of the hosts will cause different hosts to exhibit similar reported activity data, the repair to the hosts may be uniform for all the hosts of a cluster. The repair may cause the hosts to revert back to experiencing baseline conditions and activity and, accordingly, the cluster in n-dimensional space formed by the activity data of the hosts is expected to cease to exist when cluster processing is performed. Accordingly, the portion of n-dimensional space defined by the cluster may be associated with the observed malfunctioning of the host as well as the repair performed on the hosts to bring the hosts back to reporting baseline activity data. A database associating a portion of the n-dimensional space with both the malfunctioning of the host and the repair may be kept. The database may be populated as new clusters occupying different portions of the n-dimensional space are identified and as repairs to the hosts of the clusters are deployed. Further, the database may be consulted when abnormal clusters are identified for which previous repairs have been deployed. When a cluster of abnormal hosts occupying a region in n-dimensional space is identified, the database may be consulted to determine whether a previous repair to a cluster of hosts occupying a similar region in n-dimensional space was performed. If so, the previous repair may be used to mend the malfunctioning hosts of the cluster at hand. While the repair is being deployed, the progress of the repair may be monitored, whereby host activity data may be reported and cluster processing may be performed to identify whether the frequency of abnormal hosts of the cluster is decreasing. As the repair is deployed and successfully fixing the abnormal hosts, host activity data may be both reported and cluster-processed in real time. The cluster of abnormal hosts may be expected to be observed decreasing in frequency and ultimately disappearing among clusters of baseline conditions hosts.

When performing K-means clustering on host activity data, the K-means algorithm may be provided with the number of desired clusters, K, or, alternatively, the K-means algorithm may be tasked with selecting the number of clusters.

Figure 7:
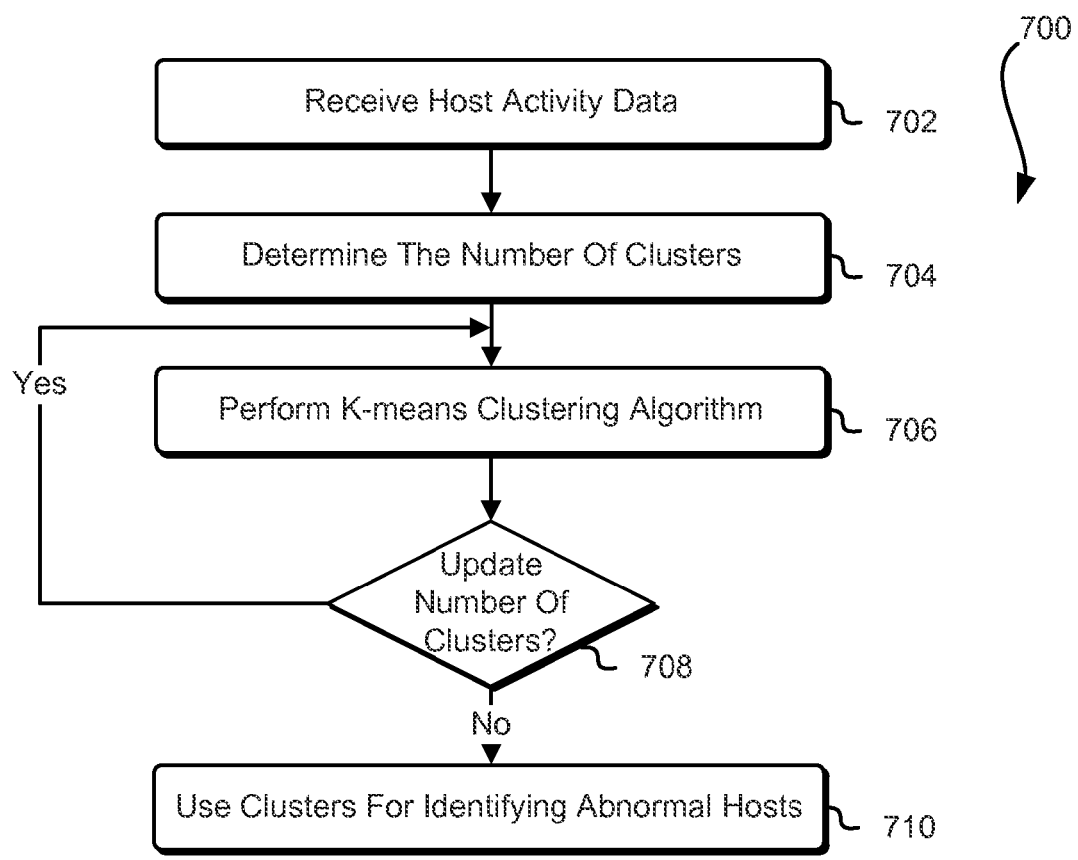
FIG. 7 shows an example of a method for performing K-means clustering.

FIG. 7 shows an example of a method for performing K-means clustering. In the process 700, a cluster processing engine, such as the cluster processing engine described with reference to numeral 406 in FIG. 4, receives 702 host activity data. As described herein, the host activity data may be an n-dimensional vector for each of a plurality of hosts. The cluster processing engine then determines 704 the number of clusters in which the plurality of vectors or data points are to be classified. The number of clusters may be provided to the cluster processing engine, for example, by a computing resource service provider, or the cluster processing engine may be tasked with determining the appropriate number of clusters for the activity data. It is noted that if the cluster processing engine is tasked with determining the appropriate number of clusters, the cluster processing engine may set the number of cluster to a low number such as one and update or increase the number of clusters as necessary. Or alternatively, the cluster processing engine may set the number of cluster to a high number and update or increase the number of clusters as necessary.

The cluster processing engine then performs 706 a K-means clustering algorithm. The cluster processing engine may select, for example, randomly, a centroid for each cluster and proceed to add data points to each cluster and recalculate the centroid. The cluster processing engine then determines 708 whether to update the number of clusters. The number of clusters may be updated if a more optimum clusters arrangement is available for the activity data. If the cluster processing engine determines that the number of clusters requires to be updated, the cluster processing engine again performs 706 a K-means clustering algorithm on the host activity data using the updated number of clusters. If, on the other hand, the cluster processing engine determines that the number of clusters does not require to be updated, the cluster processing engine uses 710 the clusters for identifying abnormal hosts as described herein.

In the embodiments described herein, any clustering algorithm other than K-mean clustering may be used including density-based spatial clustering of applications with noise (DBSCAN), ordering points to identify the clustering structure (OPTICS) among others.

Figure 8:
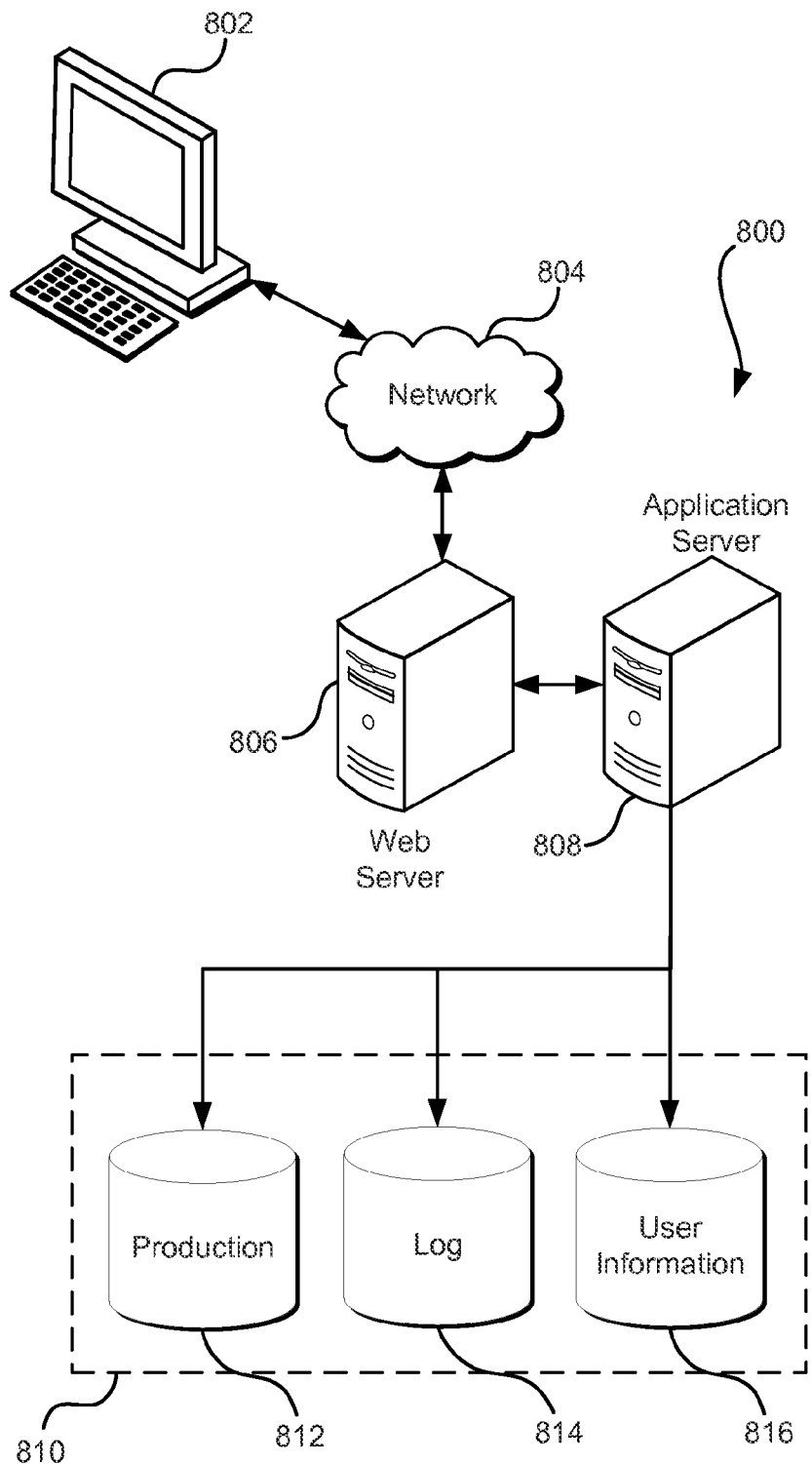
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 802 and the application server 808, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for identifying abnormal hosts, comprising:
   under control of one or more computer systems configured with executable instructions,
   receiving host activity data for a plurality of host computer systems, the host activity data for each host computer system being represented as a vector comprising a plurality of values, each value corresponding to a measurement of a host activity category;

performing cluster processing on the host activity data of the plurality of host computer systems to yield a plurality of clusters, at least one cluster of the plurality of clusters including a plurality of data points, wherein each data point of the plurality of data points represents host activity data for a different host computer system of the plurality of host computer systems;

comparing the yielded plurality of clusters to cluster-processed baseline activity data to determine if there are any abnormal clusters; and at a time after determining the presence of abnormal clusters, providing information identifying one or more abnormal host computer systems having corresponding vectors of host activity data located within the abnormal clusters.

2. The computer-implemented method of claim 1, wherein determining the presence of abnormal clusters further comprises determining whether a yielded cluster of the yielded plurality of clusters overlaps with a baseline activity cluster.

3. The computer-implemented method of claim 1, wherein:
the host activity data for each host computer system is included in a host activity report;
the host activity report is received from a virtualization layer;
the host activity report is stored in an on-demand storage service; and
receiving the host activity data includes obtaining the host activity report from the on-demand storage service.

4. The computer-implemented method of claim 3, wherein a mapping is maintained associating the host activity report with an identity of a host computer system to which the host activity report pertains, wherein the host activity data for the host computer system to which the host activity report pertains is retrieved from the host activity report based on at least in part the mapping associating the host activity report with the identity of the host computer system.

5. The computer-implemented method of claim 1, wherein the host activity category includes at least one of disk latency or activity log data.

6. The computer-implemented method of claim 1, wherein the host activity data includes a set of numeric values translated at least in part from non-numeric host activity report measurements.

7. A computer-implemented method for identifying abnormal hosts, comprising:
under control of one or more computer systems configured with executable instructions,
receiving host activity data for a plurality of hosts;
performing cluster processing on the host activity data of the plurality of hosts to yield a plurality of clusters, each yielded cluster corresponding to a subset of the plurality of hosts, wherein at least one cluster of the plurality of clusters includes a plurality of points, each point of the plurality of points representing the host activity data of a different host of the plurality of hosts;
comparing the yielded plurality of clusters to cluster-processed baseline activity data to identify a subset of the yielded clusters as abnormal clusters; and
providing information identifying one or more hosts corresponding to the identified subset of the yielded clusters.

8. The computer-implemented method of claim 7, wherein:
each yielded cluster has a boundary in Euclidean space, and wherein comparing the yielded plurality of clusters to cluster-processed baseline activity data further comprises:
determining whether the boundary of the yielded cluster overlaps, by a percentage, with a boundary of a baseline activity cluster; and
in response to determining that the boundary of the yielded cluster overlaps by the percentage with the boundary of the baseline activity cluster, determining that the yielded cluster and the baseline activity cluster are similar.

9. The computer-implemented method of claim 7, wherein comparing the yielded plurality of clusters to cluster-processed baseline activity data includes determining whether a particular yielded cluster fails, based at least in part on one or more matching criteria, to match any baseline activity cluster.

10. The computer-implemented method of claim 7, wherein each yielded cluster has a centroid and a frequency, wherein the frequency of the yielded cluster is based at least in part on a number of host activity vectors pertaining to the yielded cluster and wherein comparing the yielded plurality of clusters to cluster-processed baseline activity data further comprises:
determining whether the centroid of the yielded cluster is within a margin of a centroid of a baseline activity cluster;
determining whether the frequency of the yielded cluster is within a margin of a frequency of the baseline activity cluster; and
in response to determining that the centroid of the yielded cluster is within a margin of a centroid of a baseline activity cluster and that the frequency of the yielded cluster is within a margin of a frequency of the baseline activity cluster, determining that the yielded cluster and the baseline activity cluster are similar.

11. The computer-implemented method of claim 7, wherein the number of yielded clusters is set, in a cluster processing algorithm used to perform the cluster processing, to be greater than the number of baseline activity clusters.

12. The computer-implemented method of claim 7, wherein cluster processing is performed using K means clustering, at least one of density-based spatial clustering of applications with noise (DBSCAN) or ordering points to identify the clustering structure (OPTICS).

13. A system configured to identify abnormal hosts, comprising:
a data storage system configured to store host activity data for a plurality of hosts; and
a processor implementing a cluster processing engine configured to:
apply a clustering algorithm to the host activity data of the data storage system to yield a plurality of clusters, at least one cluster of the plurality of clusters comprising one or more data points such that each data point of the one or more data points corresponds to a different host of the plurality of hosts;
compare the plurality of clusters to one or more baseline activity clusters to determine if there are any abnormal clusters; and
take one or more actions in connection with one or more of the abnormal clusters.

14. The system of claim 13, wherein applying the clustering algorithm further comprises:
determining a number of yielded clusters;
performing the clustering algorithm on the host activity data;

determining whether a criterion is optimized; and
at a time after determining that the criterion is not optimized, updating the number of yielded clusters.

15. The system of claim 13, wherein a region of a Euclidean space that includes an abnormal cluster indicates a potential repair of the abnormal cluster.

16. The system of claim 13, further comprising a query engine configured to process host activity reports to yield the host activity data, wherein a set of host activity data is associated with one host, and wherein the host activity data is provided, from the query engine, to the cluster processing engine.

17. The system of claim 13, wherein the data storage system is further configured to store a mapping associating a host activity report with an identity of a host to which the host activity report pertains, wherein the host activity data is retrieved from the host activity report based at least in part on the mapping.

18. The system of claim 13, wherein the host activity data comprises a plurality of values, wherein each value corresponds to a measurement of a host activity category.

19. One or more non-transitory computer-readable storage media having collectively stored thereon instructions that, when executed by one or more processors of a system, cause the system to:
receive host activity data for a plurality of hosts, wherein the host activity data for each host of the plurality of hosts is represented as a plurality of values;
perform cluster processing on the host activity data of the plurality of hosts to yield a plurality of clusters, wherein at least one cluster of the plurality of clusters includes a plurality of data points, each data point of the plurality of data points representing a different host of the plurality of hosts;
compare the yielded plurality of clusters to cluster-processed baseline activity data to determine if there are any abnormal clusters; and
provide information identifying one or more hosts of an abnormal cluster.

20. The one or more non-transitory computer-readable storage media of claim 19, wherein the host activity data for each host is represented as a vector comprising the plurality of values, wherein each value of the plurality of values corresponds to a measurement of a host activity category.

21. The one or more non-transitory computer-readable storage media of claim 19, wherein performing cluster processing includes:
determining a number of clusters of the yielded plurality of clusters;
performing a clustering algorithm on the host activity data;
determining whether a criterion is optimized; and
at a time after determining that the criterion is not optimized:
updating the number of clusters.

22. The one or more non-transitory computer-readable storage media of claim 19, wherein a region of a Euclidean space that includes an abnormal cluster indicates a potential repair of the abnormal cluster.

23. The one or more non-transitory computer-readable storage media of claim 19, wherein the baseline activity data corresponds to the state of the plurality of hosts during normal operations.

24. The one or more non-transitory computer-readable storage media of claim 19, wherein cluster processing is performed using at least one of density-based spatial clustering of applications with noise (DBSCAN) or ordering points to identify the clustering structure (OPTICS).

* * * * *